United States Patent [19]

Arora et al.

[11] 4,279,714

[45] Jul. 21, 1981

[54] AC ETCHING OF ALUMINUM CAPACITOR

[75] Inventors: Mulk A. Arora; John J. Randall, Jr., both of Williamstown, Mass.

[73] Assignee: Sprague Electric Company, North Adams, Mass.

[21] Appl. No.: 187,241

[22] Filed: Sep. 15, 1980

[51] Int. Cl.³ .............................. C25F 3/04; C25F 3/14
[52] U.S. Cl. .............................. 204/129.9; 204/129.4; 204/129.95
[58] Field of Search .............. 204/129.9, 129.95, 129.4

[56] References Cited

U.S. PATENT DOCUMENTS

| 3,193,485 | 7/1965 | Vincent | 204/129.43 |
| 3,887,447 | 6/1975 | Sheasby et al. | 204/129.4 |

FOREIGN PATENT DOCUMENTS 52-64659  5/1977  Japan .

Primary Examiner—T. M. Tufariello
Attorney, Agent, or Firm—Connolly and Hutz

[57] ABSTRACT

Aluminum electrolytic capacitor foil is etched in a bath containing 0.7 to 2.0 M hydrochloric acid, 0.2 to 0.5 M hydrated aluminum trichloride, and 0.02 to 0.4 M phosphate ion while subjected to the action of alternating current at 35 to 55° C.

4 Claims, 1 Drawing Figure

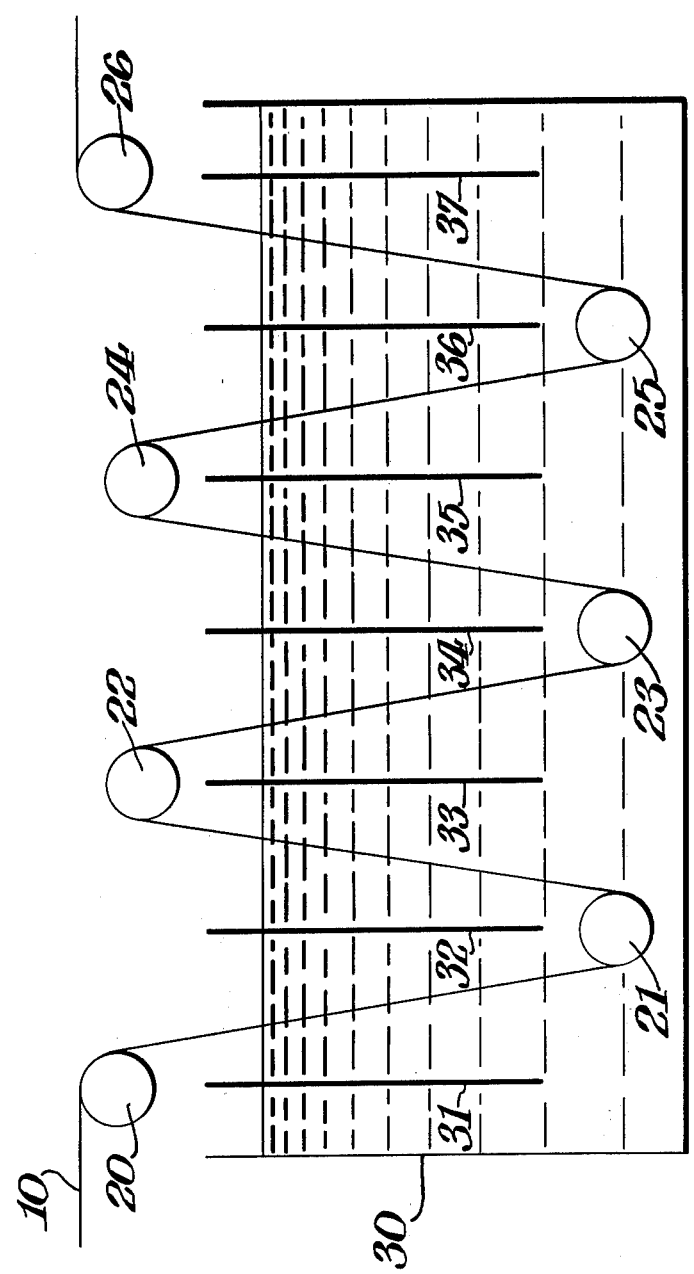

AC ETCHING OF ALUMINUM CAPACITOR

BACKGROUND OF THE INVENTION

This invention relates to the etching of aluminum foil for electrolytic capacitors, and in particular to a process utilizing alternating current and a chloride electrolyte bath containing phosphate ions.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g., interrupting the etch process to apply protective coatings, carrying out the etch process in stages of differing degrees of aggressiveness, and using additives in the electrolyte bath to control pit size or to increase mechanical strength of the foil. Another problem has been to prevent the precipitation of aluminum hydroxide, formed during etching, on or into the etched surfaces.

The resolution of these problems has led to processes in which the etch conditions are carefully controlled to provide the desired increase in surface area and, particularly for capacitor foil, little change in mechanical strength.

SUMMARY OF THE INVENTION

A process of etching aluminum capacitor foil utilizes AC current to give a uniform etch structure while maintaining the strength of the foil. The process also provides a greater etch pit density than prior art processes.

The above results are accomplished by using an etchant solution containing hydrochloric acid, hydrated aluminum trichloride, and a phosphate ion source at 35° to 55° C. and alternating current of 20 to 40 Hz frequency.

The concentration of the hydrochloric acid in the etchant is 0.7 to 2.0 M to provide strongly acidic conditions that prevent the formation and precipitation of aluminum hydroxide on the foil. The concentration of the hydrated aluminum trichloride is 0.2 to 0.5 M to prevent wide variations of aluminum ion concentration, especially with fresh etchant solution. The concentration of phosphate ion is 0.02 to 0.4 M to give the desired uniformity and etch density (number of pits/unit area of foil). It is postulated that the phosphate ion serves to passivate sites that have already been started so that etching will proceed at different sites, giving the desired etch density, rather than concentrating at started sites. More than 0.4 M phosphate ion was found to be detrimental, as it appears to cause excessive inhibition of new etch sites.

The current density is maintained at 1.6 to 4 A/in$^2$ to provide the desired number of sites. If the current density is too low, i.e., below 1.6 A/in$^2$, there will not be the desired number of sites; if too high, i.e., above 4 A/in$^2$, the etch structure becomes fragile leading to a smooth, polished surface rather than an etched one. Foil is also thinned in the latter case. The frequency of the alternating current is maintained at 20 to 40 Hz as this frequency gives etched foil with optimum capacitance. The voltage, a function of current density and etch cell design, is ±7 V. With a different cell design, the voltage will differ also.

The temperature of the etchant solution is maintained at 35° to 55° C. to provide pores of suitable size and density. Lower temperatures result in fewer, larger pores while higher temperatures give more pores but narrower pits and lower capacitance. Etching time is 2 to 6 min.

BRIEF DESCRIPTION OF THE DRAWING

The sole FIGURE shows foil being etched by the process of the present invention.

DESCRIPTION OF THE PREFERRED EMBODIMENTS

Aluminum foil 10 is passed over roller 20 into tank 30 containing the hydrochloric acid-aluminum chloride-phosphate etchant solution of the present invention. Electrodes 31, 32, 33, 34, 35, 36 and 37 are connected to an AC source (not shown). Foil 10 passes between electrodes 31 and 32 and under roller 21, thence between electrodes 32 and 33 and out of the etchant over roll 22, back into the etchant between electrodes 33 and 34, under roller 23, between electrodes 34 and 35, over roller 24, between electrodes 35 and 36, under roller 25 and finally between electrodes 36 and 37 out of tank 30 and over roller 26.

This particular arrangement provides for a minimum number of electrodes as electrodes 31 and 32 form a pair as do 32 and 33, 33 and 34, 34 and 35, 35 and 36, and 36 and 37. A complete pass is defined as the path between the adjacent rolls that are out of the tank, i.e. between 20 and 22, 22 and 24, and 24 and 26. Hence, in the arrangement shown, there are three complete passes utilizing a total of seven electrodes. More electrodes may be used for a greater number of passes per tank or other arrangements may be used. The rolls 21–25 are preferably the same size as the distance between electrodes and so arranged that the foil passes vertically between electrodes.

The etched foil obtained by the method of the present invention has a metallic core, that gives good mechanical properties and low-temperature capacitance retention.

In the examples below, soft foil of 99.99% purity was used. Hard foil can be etched by this process, as can foil of different purity, but satisfactory capacitance is obtained without resorting to hard foil.

EXAMPLE 1

A series of runs were made using as etchant a solution of 1.5 M hydrochloric acid, 0.2 M aluminum chloride, and 0.02 M ammonium phosphate. The frequency of the alternating current was 45 Hz. Soft 2.9 mil aluminum foil was used; thickness refers to final thickness in mils. Capacitance per unit area (Cap) is given in microfarads per square inch, $\mu$F/in$^2$, and etch time in minutes.

TABLE 1

| Sample | Amps/in$^2$ | Time | Temp. °C. | Wt-loss % | Thickness | 30V Cap |
|---|---|---|---|---|---|---|
| 1 | 2.03 | 2.5 | 62.5 | 29.9 | 2.6 | 36.8 |
| 2 | 2.03 | 3.0 | 62.5 | 36.7 | 2.6 | 46.0 |
| 3 | 3.05 | 1.8 | 63.0 | 29.3 | 2.5 | 32.7 |
| 4 | 3.05 | 2.0 | 63.0 | 33.1 | 2.5 | 39.6 |
| 5 | 1.02 | 6.0 | 60.0 | 31.7 | 2.1 | 20.0 |

EXAMPLE 2

Another series of runs were made at a frequency of 30 Hz and a current density of 2.8 A/in$^2$. The etchant solution was 1.4 M hydrochloric acid, 0.4 M aluminum trichloride, and 0.2 M phosphoric acid. Soft 3.3 mil foil was used, and thickness given is the final thickness. The other units are as given in Example 1.

TABLE 2

| Sample | Time | Temp. °C. | Wt-loss % | Thickness | 30V Cap |
|---|---|---|---|---|---|
| 1 | 2.7 | 44.5 | 29.2 | 3.15 | 71.2 |
| 2 | 3.0 | 44.5 | 31.7 | 3.10 | 64.8 |
| 3 | 3.3 | 44.0 | 37.5 | 3.05 | 81.5 |

EXAMPLE 3

Foil 2.9 mil thick was etched at 30° C., at 30 Hz and 3 A/in$^2$ current density for 2.5 min in an etchant solution of 2.2 M hydrochloric acid, 0.6 M aluminum trichloride, and 0.4 M phosphoric acid. Higher hydrochloric acid and aluminum chloride concentrations gave less reproducible results. Average results are presented below.

TABLE 3

| Thickness | Wt-loss % | 30V Cap |
|---|---|---|
| 2.75 mil | 27.1 | 68.7 |

EXAMPLE 4

In this example, average results are presented for 2.9 mil thick foil etched at 70° C., 3.5 A/in$^2$ current density, 30 Hz frequency for 2.2 min in an etchant solution of 0.75 M hydrochloric acid, 0.2 M aluminum trichloride, and 0.11 M phosphoric acid.

TABLE 4

| Thickness | Wt-loss % | 30V Cap |
|---|---|---|
| 2.7 mil | 30.5 | 53.7 |

EXAMPLE 5

In this example, etching was carried out at 4 A/in$^2$ current density, 30 Hz, and 45° C. for 1.9 min using an etchant solution of 1.3 M hydrochloric acid, 0.36 M aluminum trichloride, and 0.2 M phosphoric acid. Average results on 2.9 mil foil are given below.

TABLE 5

| Thickness | Wt-loss % | 30V Cap |
|---|---|---|
| 2.7 mil | 35.3 | 71.2 |

EXAMPLE 6

This run was carried out at 20 Hz frequency, 2.8 A/in$^2$ current density, and 45° C. using an etchant solution of 1.4 M hydrochloric acid, 0.39 M aluminum trichloride, and 0.22 M phosphoric acid. Foil 2.9 mil thick was etched at two different etch times.

TABLE 6

| Etch Time | Thickness | Wt-loss % | 30V Cap |
|---|---|---|---|
| 3 min | 2.65 | 36.7 | 73.6 |
| 3.5 min | 2.45 | 42.7 | 80.2 |

The range of etchant solution composition and process variables that give the desired etching, as reflected by capacitance, is 0.7 to 2 M hydrochloric acid, 0.2 to 0.5 M aluminum trichloride, 0.02 to 0.4 M phosphate ion, 35° to 55° C., 20 to 40 Hz frequency and 1.6 to 4 amps/in$^2$ current density.

What is claimed is:

1. A process for the electrolytic etching of aluminum electrolytic capacitor foil comprising passing the foil between electrodes supplied with alternating current in a bath containing 0.7 to 2 moles/liter hydrochloric acid, 0.2 to 0.5 moles/liter hydrated aluminum trichloride, and 0.02 to 0.4 moles/liter phosphate ion at a temperature of 35° to 55° C.

2. A process according to claim 1 wherein the anodic current density is 1.6 to 4 amps/in$^2$ and the frequency of the alternating current is 20 to 40 Hz.

3. A process according to claim 1 wherein the concentration of said hydrochloric acid is 1.4 M, the concentration of said hydrated aluminum chloride is 0.4 M, the concentration of said phosphate ion is 0.2 M, and said temperature is 45° C.

4. A process according to claim 1 wherein the etching time is 2 to 6 minutes.

* * * * *